United States Patent

[11] 3,583,134

| [72] | Inventors | Heinz Kemper;<br>Wilhelm Ahler, both of Stadtlohn,<br>Germany |
|---|---|---|
| [21] | Appl No. | 748,107 |
| [22] | Filed | July 26, 1968 |
| [45] | Patented | June 8, 1971 |
| [73] | Assignee | Firma Wilhelm Kemper<br>Landmaschinenfabrik<br>Stadtlohn, Germany |
| [32] | Priority | Aug. 1, 1967, Sept. 21, 1967, Oct. 2, 1967 |
| [33] | | Germany |
| [31] | | P 16 57 329.8, P 15 82 280.7 and P 16 57 330.1 |

[54] CROP-HARVESTING STRUCTURE
11 Claims, 9 Drawing Figs.

[52] U.S. Cl............................................. 56/13.3,
56/61, 56/95, 56/503, 171/61, 56/14.2, 56/14.9
[51] Int. Cl........................................................ A01d 45/02
[50] Field of Search.......................................... 56/15, 16,
60, 61, 24, 27, 95, 119, 255, 327, 10, 503.23;
171/26, 61, 60, 27, 28

[56] References Cited
UNITED STATES PATENTS

| 1,784,081 | 12/1930 | Urschel | 171/60X |
| 1,832,094 | 11/1931 | Campbell | 56/16 |
| 2,281,904 | 5/1942 | Wurtele | 56/15 |
| 2,477,794 | 8/1949 | Gehl | 56/60X |
| 2,595,336 | 5/1952 | Corsentino | 56/15 |
| 2,648,944 | 8/1953 | Powers | 56/119 |
| 2,854,806 | 10/1958 | Slavens | 56/119X |
| 3,262,503 | 7/1966 | Zijlstra et al. | 171/61 |
| 3,405,513 | 10/1968 | Suverkrop | 56/15 |
| 3,460,326 | 8/1969 | Holm | 56/119 |

FOREIGN PATENTS

| 459,640 | 9/1968 | Switzerland | 56/16 |
| A23196III 45e | 9/1956 | Germany | 56/24 |

Primary Examiner—Louis G. Mancene
Assistant Examiner—J. A. Oliff
Attorney—Arthur O. Klein

ABSTRACT: A structure or harvesting crops such as corn, beets, and the like. The structure includes a rotary disc for chopping the crops, and a pair of rollers and a pair of feed screws for feeding crops to a work station located over the rotary disc. A blower coacts with the rotary disc for receiving the chopped crops therefrom and for conveying the crops to a collecting station. The pair of rollers, pair of feed screws, rotary disc, and blower all form a unitary structure adapted to be pulled by a tractor along the ground with the rotary disc situated closely adjacent to the ground. This rotary disc is provided at its outer periphery with cutting blades for cutting through the stalks of crops such as corn or the like.

PATENTED JUN 8 1971

3,583,134

PATENTED JUN 8 1971 3,583,134

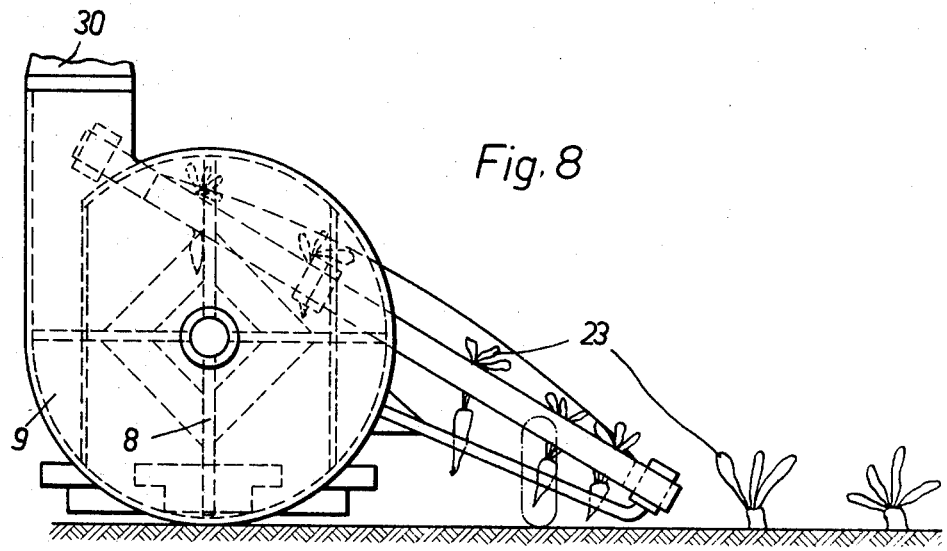
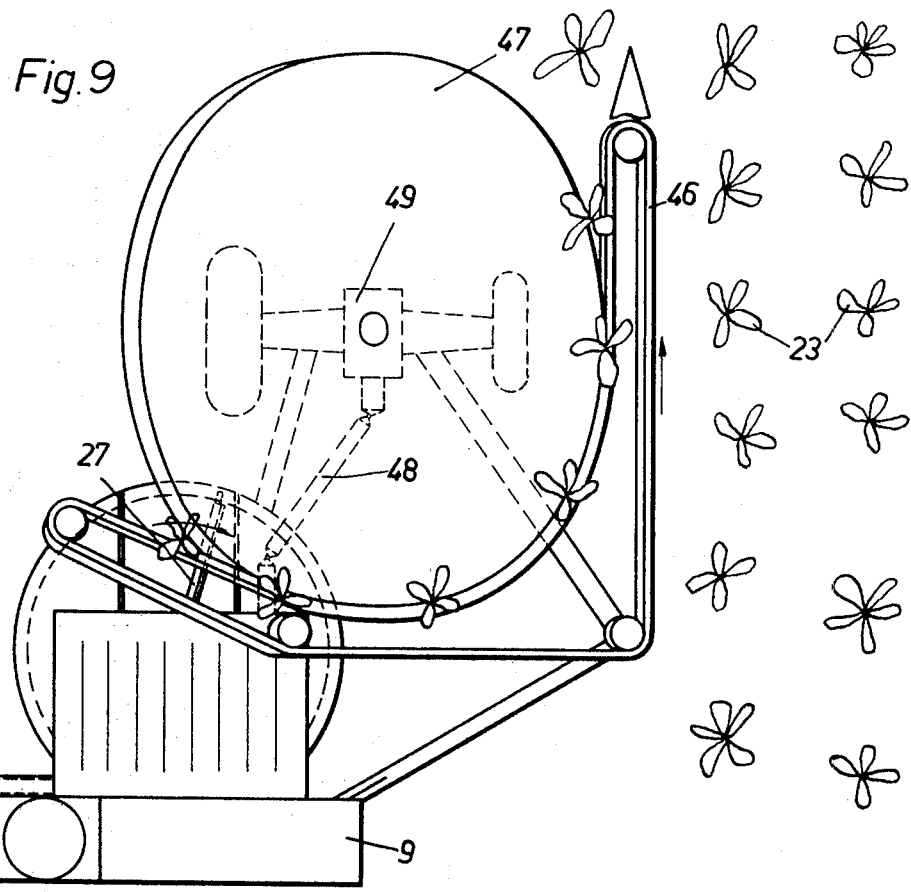

CROP-HARVESTING STRUCTURE

BACKGROUND OF THE INVENTION

The present invention relates to machines for harvesting crops such as corn, beets, and the like.

In particular, the present invention relates to units which can be connected to a tractor to be pulled by the latter while the unit acts on the crops in the ground to harvest the crops.

In particular, the invention relates to a structure of this type which can harvest crops which grow on stalks such as corn, not only cutting through the crops but also chopping the crops and delivering the chopped crops to a desired collecting station.

With conventional structures of this type exceedingly complex assemblies are required, and the structures are often not robust enough to withstand the stresses to which they are subjected. Furthermore, the known constructions are quite expensive and do not provide the desired cutting and chopping operations with the desired efficiency.

In addition, it is not always a simple matter to change a given unit from one type of crop-harvester to another type of crop-harvester, such as from harvesting a stalk-type of crop to a construction for harvesting a crop such as beets which must be pulled out of the ground and then chopped.

Furthermore, the known constructions have components which are subject to rapid wear, and the operating costs of the known constructions are quite high.

SUMMARY OF THE INVENTION

It is accordingly a primary object of the invention to provide a construction which will avoid all of the above drawbacks.

In particular, it is an object of the invention to provide a simple, relatively inexpensive, rugged structure capable of harvesting crops of the stalk type, such as corn.

Furthermore, it is an object of the invention to provide a construction which can be adapted for use either with a stalk-type of crop or with a crop which must be pulled out of the ground and then chopped, such as beets.

Also, it is an object of the present invention to provide a rugged structure of the above type which is composed of a relatively small number of parts so that the structure is relatively inexpensive, while at the same time it can be operated at low cost and does not subject its components to rapid wear.

With the structure of the invention there is provided a rotary chopping means which during operation is situated in the region of the surface of the ground and which is pulled forwardly by a tractor or the like. This rotary chopping means is situated beneath a work station where the crops become located to be acted upon by the rotary chopping means. The rotary chopping means carries at its periphery cutting blades for cutting through the stalks, while it also has chopping blades for chopping the crops after the stalks have been cut through. The rotary chopping means includes a rotary disc having chopping blades at its upper side. A crop-feeding means feeds the crops to the work station over the rotary chopping means, and this crop-feeding means also extends forwardly in the direction in which the entire unit is moved by a tractor. This crop-feeding means holds the crops in an upright position while directing them to the rotary chopping means. A conveyor means coacts with the rotary chopping means for conveying the crops chopped thereby to a collecting station.

Preferably the rotary chopping means together with the crop-feeding means and the conveyor means are united into a single unitary assembly capable of sliding or floating along the ground close to the latter. Thus, this assembly may in its entirety be carried by a hydraulically operated three-point support structure of a tractor. The support structure which is connected to the tractor, extends therefrom to the unit of the invention and carries a drive mechanism which is driven by a power takeoff shaft of the tractor and thus transmits the drive to the rotary chopping means, crop-feeding means, and conveyor means. This drive mechanism may take the form of a sprocket-chain drive, for example. The conveyor means preferably takes the form of a blower which directs air through a suitable conduit to carry the chopped crops, suspended in the air, to a collecting station.

The rotary chopping means may rotate in a horizontal plane which is parallel to the ground and carries at its underside radially extending projections which transport the chopped crops to the blower-conveyor through an opening in the housing of the later. The stalk-cutting blades situated at the periphery of the rotary chopping means move through the opening in the housing of the blower, and the rotary speed of a bladed wheel of the blower is coordinated with the rotary speed of the chopping means so that the cutting blades at the periphery of the latter can only enter into spaces between the blades of the blower wheel.

The crop-feeding means which is situated over the working station above the rotary chopping means and which extends forwardly in the direction of travel of the device serves to hold the crops up while directing them into the device and feeding them to the working station from where they are received by the rotary chopping means. Preferably this crop-feeding means takes the form of a pair of horizontal parallel rotary feed screws situated one beside the other and rotating respectively in opposite directions with these feed screws respectively having tapered feed-in tips. The portions of the rotary feed screws which are situated directly over the work station take the form of pressing and feeding rolls which compress the crops and feed them down to the work station where they are received by the rotary chopping means. In front of these feed screws are a pair of inclined bars which are inclined forwardly and downwardly and which serve to raise the leaves of the crops.

In addition, it is possible to replace the structure which coacts with stalk-type of crops with a structure capable of pulling beets from the ground and dropping them through the work station to the rotary chopping means. For this purpose the beet-pulling structure can be attached to the other structure by suitable bolts and nuts or by plug-and-socket types of connections. The beet-pulling structure can take the form of a pair of endless belts having inner runs pressing against each other and between which the beets are compressed and pulled from the ground and then dropped down through the work station to the rotary chopping means. Instead of a pair of endless belts, however, it is possible to use a single endless belt which coacts with a pulley for pulling beets from the ground and dropping them through the work station to the rotary chopping means. With this construction it is possible to adapt the machine of the invention for operating on beets, such as fodder or stubble beets, which after being chopped are also delivered by the conveyor means to a collecting station, such as a suitable transporting wagon.

BRIEF DESCRIPTION OF DRAWINGS

The invention is illustrated by way of example of the accompanying drawings which form part of this application and in which:

FIG. 8 is an end elevation of the machine of FIG. 1 adapted for beet-pulling with a different embodiment of beet-pulling device; and FIG. 9 is a top plan view of the structure of FIG. 8.

DESCRIPTION OF PREFERRED EMBODIMENTS

Figure 5:
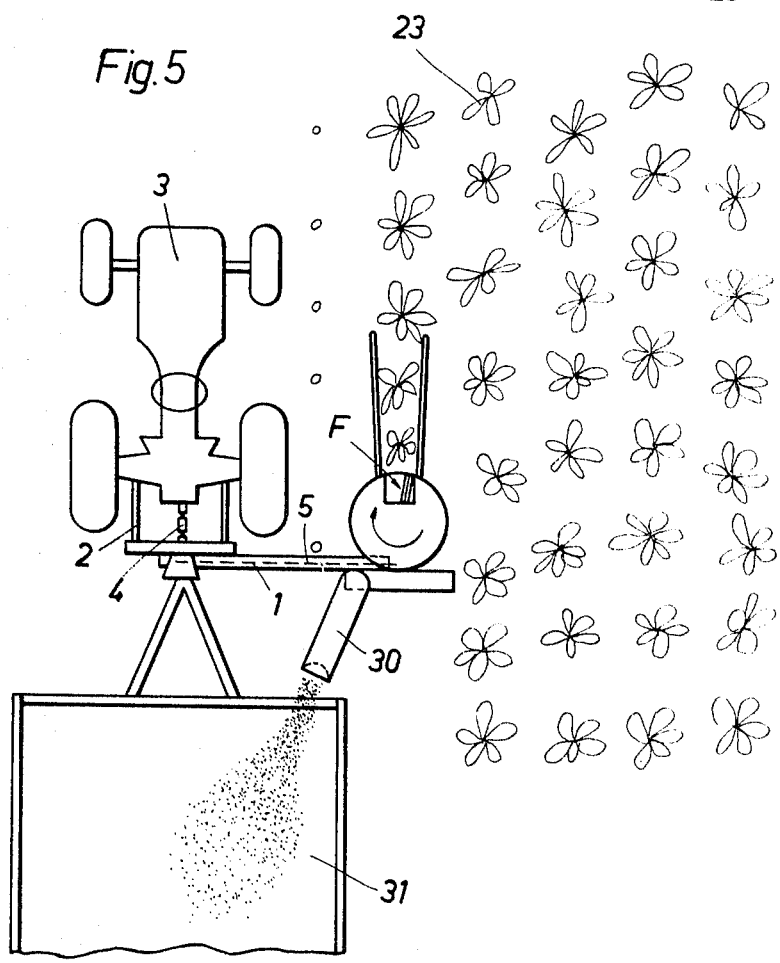
FIG. 5 is a schematic plan view showing the machine of FIGS. 1—4 while it operates in a field of crops which are to be harvested.

Referring to FIG. 5, the structure shown therein includes the support means 1 which at its right end carries the harvesting structure of the invention and which at its left end is fixed to a three-point suspension at the rear of the tractor 3, this suspension for the support means 1 being hydraulically actuated in a known way. The tractor 3 has a power takeoff shaft which through a universal drive 4 serves to transmit the drive from the tractor to a chain drive 5 carried by the support means 1 and including sprocket wheels and a chain. This chain drive carried by the support means 1 serves to drive a sprocket wheel 6 which is carried by the structure shown in FIGS. 1 and 2.

Figure 1:
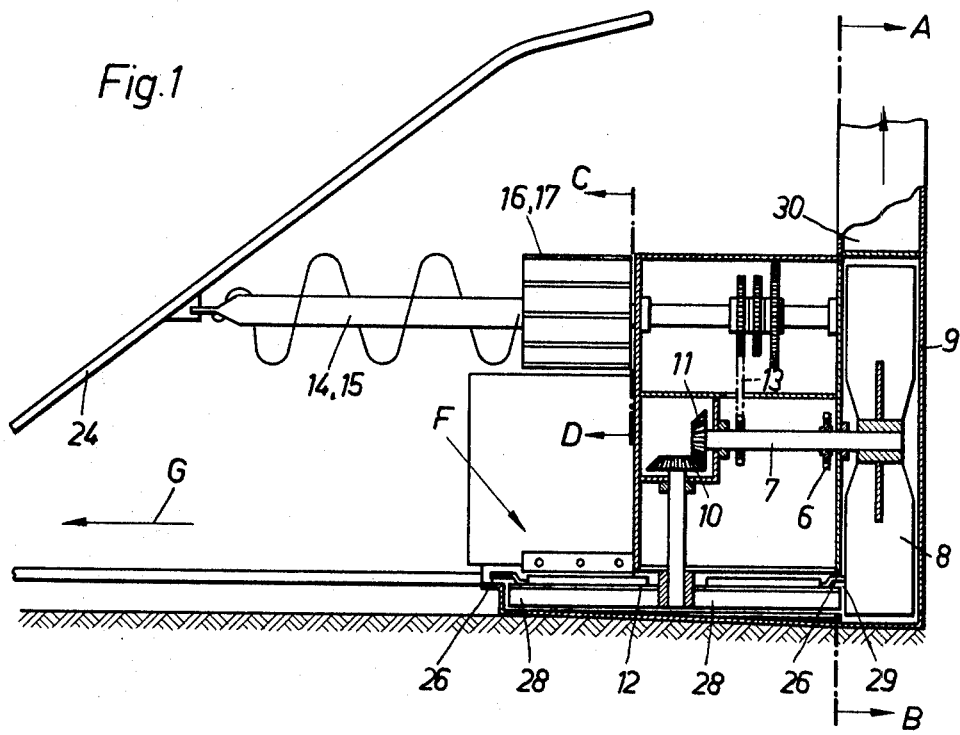
FIG. 1 is a fragmentary side elevation of one embodiment of a machine according to the invention, the structure being shown partly in section so as to more clearly illustrate the drive structure and the arrangement of the blower-conveyor.
Figure 2:
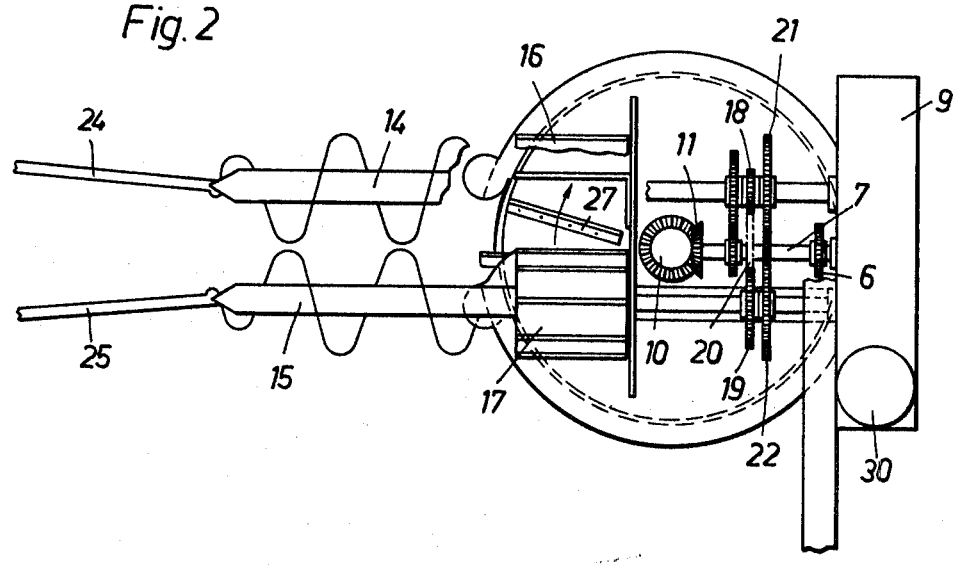
FIG. 2 is a plan view of the machine of FIG. 1, with the outer covering and protective walls removed to clearly illustrate the structure of the invention.
Figure 4:
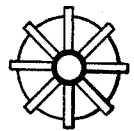
FIG. 4 is an end elevation of a compression and feeding roll at the end of a feed screw, taken along line C-D of FIG. 1 in the direction of the arrows.
Figure 3:
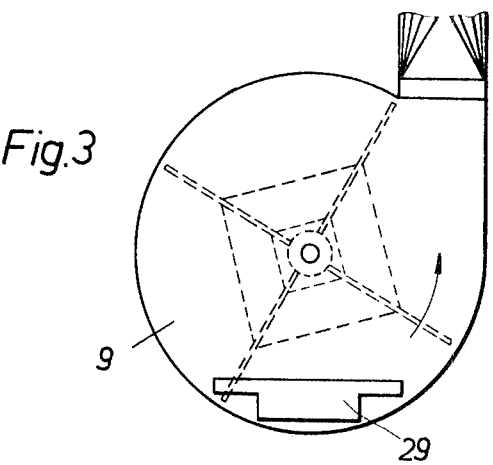
FIG. 3 is a transverse illustration of the blower structure of FIG. 1 taken along line A-B of FIG. 1 in the direction of the arrows.

As is apparent from FIG. 1, the sprocket wheel 6 is fixed to a main rotary drive shaft 7 which serves to rotate the bladed wheel 8 of a blower-conveyor means 9. Moreover, by way of the main drive shaft 7, through a bevel-gear transmission 10, 11, the drive is transmitted to a rotary chopping means 12 which includes a flat disc which extends parallel to and is located close to the ground, as is apparent from FIG. 1. The drive is also transmitted by way of a second chain drive transmission 13 from the main drive shaft 7 to a pair of oppositely rotating feed screws 14, 15 which form a crop-feeding means.

The pair of parallel horizontally extending feed screws 14,15 are situated over a work station F which is situated at the front part of the machine as seen in the direction of travel thereof. The feed screws 14,15 extend forwardly beyond the work station F in a horizontal direction parallel to and located beside each other. Preferably the parts of the feed screws 14,15 situated over the work region F can, for the embodiment shown in FIGS. 1—5, take the form of a pair of pressure and feed rolls 16,17. At their front ends the feed screws 14,15 have tapered feed-in tips.

The sprocket wheels 18, 19 as well as a chain 20 extending therebetween serve to reduce the speed with which the feed screws 14,15 are rotated, so that they form a stepdown transmission to the feed screws. Gears 21 and 22 mesh with each other and are coaxial with the feed screws for assuring rotation of the feed screws in opposed directions which will advance the crops toward the right, as viewed in FIGS. 1 and 2. Moreover, the directions of rotation of the feed screws 14 and 15 is such that those surfaces of the compression and feed rollers 16,17 which are nearest to each other between the axes of the feed screws move downwardly while rotating around the axes of the feed screws so as to feed the crops downwardly to the work station F.

The crops 23 which are arranged in rows as indicated in FIG. 5, these crops being corn, for example, are engaged during movement of the structure of the invention in the direction G (FIG. 1) in response to travel of the tractor 3 in this direction, by leaf-lifting bars 24,25 arranged in front of the feed screws 14,15 and inclined forwardly and downwardly, as illustrated in FIG. 1. These leaf-raising bars 24,25 are supported by the frame structure of the machine in any suitable way and are provided with bearings in which the front tips of the rotary feed screws are journaled as schematically indicated in FIG. 1.

The rotary feed screws 14,15 feed the crops 23, during simultaneous movement of the device in its entirety, to the periphery of the horizontal rotary chopping means 12 which is situated closely adjacent to the ground, so that the stalks will initially be engaged by cutting blades 26 carried by the periphery of the rotary chopping means and distributed about this periphery. Thus, by way of these cutting blades 26 the stalks are first cut through. These stalks which have thus been severed by the blades 26 are now compressed between the rollers 16,17 while being fed downwardly by the latter against the chopping blades 27 of the rotary chopping means 12 which includes a flat disc carrying the blades 27 and the cutters 26, the disc being formed in the region of the blades 27 with suitable cutouts through which the chopped crops can fall down below the chopping blades 27. Thus, the rollers 16,17 will compress the crops and feed them down to the chopping blades 27 to be chopped by the latter. The crop-feeding means 14—17 thus guarantees that the crops are maintained in a substantially vertical attitude not only when they are cut at their stalks by the blades 26 but also while being chopped by the blades 27, the crops being fed down through the work station F to the rotary chopping means 12 while being maintained in this vertical position to be chopped by the blades 27, so that in this way an extremely fine and exact chopping action takes place.

The working station for region F over the rotary chopping means 12, where the crops are first cut at their stalks by the blades 26 and then chopped by the chopping blades 27 during simultaneous downward feeding of the crops, communicates through the spaces of the disc of the rotary chopping means with an opening formed in a housing of the blower which forms the conveyor means. This housing has walls in which the rotary chopping means is also enclosed, and the housing has a bottom wall which forms the lowermost wall of the structure next to the ground surface and on which the chopped crops are received from the rotary chopping means.

The rotary chopping means carries at its underside a plurality of projections in the form of elongated radially extending ribs 28 which sweep across the upper surface of the bottom wall of the housing structure so as to feed the chopped crops through the opening 29 of the housing into the blower to be acted upon by the stream of air created by the rotary bladed wheel of the blower. The opening 29 is formed in a vertical wall which extends perpendicularly to the disc of the chopping means 12.

It is to be noted that the blades 26 during their rotary movement pass through and along the opening 29 so as to extend partly into the blower housing. The speed of rotation of the rotary chopping means and the speed of rotation of the fan wheel 8 of the blower 9 are made equal to each other so that they have with respect to each other a relationship which will enable the blades 26 to enter into spaces between successive fan blades without engaging the fan blades. Thus, the angular positioning of the fan wheel together with the angular positioning of the rotary chopping means provides, as a result of the equal speeds of rotation thereof, what amounts to an intermeshing of the blades of the fan with the cutting blades 26 without any direct engagement therebetween. In addition, the equal speeds of rotation of the rotary chopping means 12 and the fan wheel 8 provides a frictionless further conveying of the chopped crops from the projections 28 to the blower-conveyor means 9. The outlet of the conveyor means 9 provides a path along which the chopped crops are thrown through a tubular duct 30 to a collecting station formed by a wagon 31 situated behind and connected to the tractor 3 to move therewith, and by way of this wagon it is possible to bring the collected crops to a suitable silo where they are stored.

Figure 6:
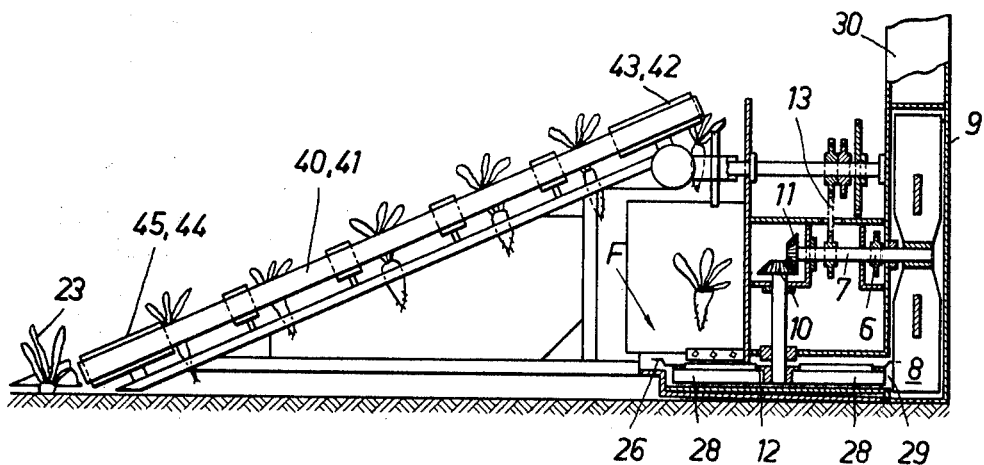
FIG. 6 is a side elevation of the machine of FIG. 1 converted to use for beet-pulling.
Figure 7:
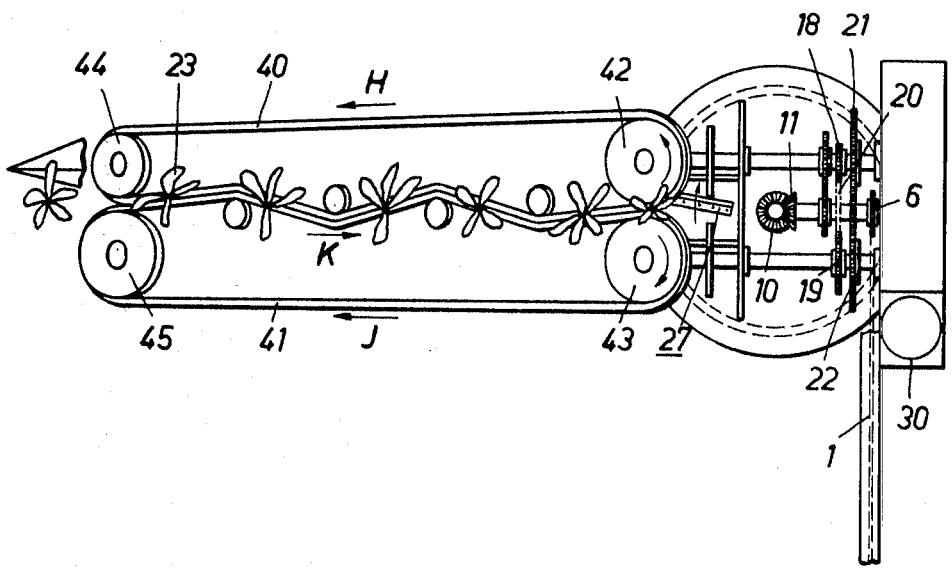
FIG. 7 is a top plan view of the machine of FIG. 8.

FIGS. 6 and 7 show an embodiment of the invention which is identical with that of FIGS. 1—5 except for the structure which feeds the crops to the chopping means. Thus, this embodiment has the same rotary chopping means 12 and the same structure for transporting the chopped crops to the blower-conveyor means 9 through the opening 29.

However, with this embodiment, instead of a crop-feeding means in the form of feed screws, a beet-pulling device is provided to pull beets out of the ground and drop them through the work station F to the rotary chopping means to be chopped thereby. According to FIGS. 6 and 7, the beet-pulling device is embodied in the form of a pair of endless belts 40,41 driven by pulleys 42 and 43 and guided about pulleys 44 and 45 in such a way that the outer runs of the belts move in the directions of the arrows H and J (FIG. 7), while the inner runs of the belts move in the opposite direction upwardly from the ground to a region over the work station F. The endless pulley belts 40,41 grip the crops 23 which in this case may be stubble beets, for example, pull these crops out of the ground, and convey them in the direction of the arrow K (FIG. 7) upwardly from the ground to a location over the work station F beneath which the rotary chopping means 12 is located. At this location the beets fall down and are acted upon by the chopping blades 27. The chopped crops are in this case also transported by the projections 28 into the blower-conveyor means 9 through the opening 29 to be carried along in the air stream to the collecting station formed, for example, by the transporting wagon 31.

With the embodiment which is shown in FIGS. 8 and 9, there is also a beet-pulling device used instead of the feed screws and pressure and feeding rollers of FIGS. 1—5. However, with this embodiment the beet-pulling device includes a single endless belt 46 guided around suitable rollers and engaging a pulley 47 so that the pressure of the single belt against the periphery of the pulley can be used for gripping the crops and pulling them out of the ground and dropping them down through the work station F. The drive is transmitted directly to the pulley 47 which rotates the belt 46 by frictional engagement therewith.

This drive is delivered through transmission 48, in the form of shafts interconnected through suitable universal joints, for example, and the drive from the transmission 48 is delivered to a transmission 49 which includes suitable bevelled gears or the like and from which a shaft extends up to the pulley 47 so as to rotate the latter. The drive transmission 49 which is connected to the transmission 48 is itself directly carried by the undercarriage which supports the pulley and belt type of beet-pulling device of this embodiment. This undercarriage is shown most clearly in dotted lines in FIG. 9. Thus, the crops 23, which in this case may be stubble beets, are pulled out of the ground and transported in an upwardly inclined and curved direction to the region over the work station F through which the crops drop to be received and acted upon by the rotary chopping means. Then the chopped crops are handled in the same way as described above in connection with FIGS. 1—5 and 6 and 7.

Although the invention is illustrated and described with reference to a plurality of preferred embodiments thereof, it is to be understood that it is in no way limited to the disclosure of such a plurality of preferred embodiments but is capable of numerous modifications within the scope of the appended claims.

Both with the embodiment of FIGS. 6 and 7 as well as with that of FIGS. 8 and 9 the beet-pulling device is removably connected to the remaining structure through suitable bolts and nuts or through suitable plug-and-socket connections, and in the same way the feed means of FIGS. 1—5 formed by the screws 14,15 and the roller 16,17 are removably connected as through sleeves having inner splined connections to the drive shaft, so that with this construction it is a simple matter to replace one type of crop-feeding means with another type, depending upon the nature of the crops which are to be harvested.

What we claim is:

1. A machine for harvesting crops which is adapted to be moved in a predetermined direction, comprising in combination,
   a pair of substantially horizontal rotary feeding screws rotatably mounted in said machine and driven in opposite directions with respect to each other;
   a pair of rollers rotatably mounted in said machine behind and parallel to said pair of feeding screws;
   a rotary disc arranged to rotate in a substantially horizontal plane adjacent to and substantially parallel to the ground;
   and a blower mounted adjacent to the periphery of said rotary disc in said machine, said blower including a housing and a blower wheel rotatably mounted in said housing and rotating in a substantially vertical plane and coacting with said rotary disc to receive chopped stalks therefrom;
   said pair of substantially horizontal rotary feeding screws being adapted to engage the stalks of the crop to be harvested and feed the stalks having been cut to said pair of rollers where the stalks are engaged and fed to a working station located above said rotary disc, the latter chopping said stalks and feeding them into said housing, said blower delivering said chopped stalks to a collecting station.

2. The machine as set forth in claim 1, wherein said pair of horizontal rotary feeding screws, said pair of rollers, said rotary disc and said blower form a unitary assembly adapted to be moved along the ground, and including a tractor for pulling said unitary assembly along the ground, support means carried by said tractor and supporting said unitary assembly, said tractor having a power takeoff shaft, and drive means driven by said power takeoff shaft, carried in part by said support means, and operatively drivingly connected to said pair of feeding screws, said pair of rollers, said rotary disc and said blower.

3. The combination of claim 2 and wherein said blower wheel has a plurality of fan blades equidistantly arranged thereon to provide spaces therebetween, said drive means driving said blower wheel and rotary disc at speeds, with respect to each other, which will situate the cutting blades at the periphery of said rotary disc in the spaces between fan blades of said blower wheel, said cutting blades extending through said housing opening of said blower.

4. The combination of claim 3 and wherein a pair of leaf-raising bars are situated in advance of said fee screws and are inclined downwardly and forwardly with respect thereto.

5. The machine as set forth in claim 1, wherein said rotary disc has an outer periphery carrying cutting blades for cutting through the stalks of crops such as corn or the like, and wherein said rotary disc has an upper side carrying chopping blades for chopping up the cut stalks.

6. The machine as set forth in claim 5, wherein said rotary disc carries at its underside elongated substantially radial projections for directing the chopped crops to said blower, said housing of the latter being formed with an opening through which the crops are fed by said radial projections.

7. The machine as set forth in claim 1, wherein said pair of feed screws and said pair of rollers are detachably mounted in said machine and have been detached and including a beet-pulling device detachably mounted in said machine for pulling beets out of the ground and dropping them through said work station to said rotary disc.

8. The machine as set forth in claim 1, wherein said pair of feeding screws and said pair of rollers are coaxially arranged with respect to each other.

9. The combination of claim 7 and wherein said beet-pulling device includes an endless belt and a pulley coacting therewith for compressing beets between the pulley and belt to pull the beets from the ground and direct them to a location over the work station where they fall to said rotary disc.

10. The combination of claim 7 and wherein said beet-pulling device includes a pair of endless belts having inner runs engaging each other for gripping beets therebetween and directing them to said working station.

11. The combination of claim 1 and wherein said pair of feed screws and said pair of rollers maintain the crops in an upright position while feeding the crops to said work station.